(12) United States Patent
Yamagishi et al.

(10) Patent No.: US 7,846,597 B2
(45) Date of Patent: Dec. 7, 2010

(54) FUEL CELL SYSTEM AND METHOD FOR OPERATING THE SYSTEM

(75) Inventors: Norio Yamagishi, Nishikamo-gun (JP); Akihisa Hotta, Ichinomiya (JP); Norimasa Ishikawa, Toyota (JP); Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/837,774

(22) Filed: Jul. 16, 2010

(65) Prior Publication Data

US 2010/0279193 A1    Nov. 4, 2010

Related U.S. Application Data

(62) Division of application No. 12/086,770, filed as application No. PCT/JP2006/323866 on Nov. 22, 2006.

(30) Foreign Application Priority Data

Dec. 19, 2005  (JP) .............................. 2005-365385
Oct. 19, 2006  (JP) .............................. 2006-285092

(51) Int. Cl.
*H01M 8/04* (2006.01)
(52) U.S. Cl. ................. 429/428; 429/443; 429/444; 429/446
(58) Field of Classification Search ............... 429/428, 429/443, 444, 446
See application file for complete search history.

(56) References Cited

U.S. PATENT DOCUMENTS

| | | | | |
|---|---|---|---|---|
| 2004/0067399 A1* | 4/2004 | Kobayashi et al. | ............ | 429/25 |
| 2004/0193379 A1 | 9/2004 | Lillis et al. | | |
| 2004/0232373 A1 | 11/2004 | Sonoda et al. | | |
| 2005/0118475 A1 | 6/2005 | Ueda et al. | | |
| 2006/0231785 A1 | 10/2006 | Hans et al. | | |
| 2007/0231625 A1 | 10/2007 | Okumi | | |
| 2009/0130510 A1 | 5/2009 | Ishikawa et al. | | |

FOREIGN PATENT DOCUMENTS

| | | | |
|---|---|---|---|
| JP | 06-275300 | A1 | 9/1994 |
| JP | 2000-097353 | A1 | 4/2000 |
| JP | 2002-373687 | A1 | 12/2002 |
| JP | 2003-123822 | A1 | 4/2003 |
| JP | 2004-048981 | A1 | 2/2004 |
| JP | 2004-178847 | A1 | 6/2004 |
| JP | 2004178847 | A * | 6/2004 |
| JP | 2004-342386 | A1 | 12/2004 |
| JP | 2005-044654 | A1 | 2/2005 |

(Continued)

*Primary Examiner*—Emily M Le
*Assistant Examiner*—Jared Wood
(74) *Attorney, Agent, or Firm*—Kenyon & Kenyon LLP (57) ABSTRACT

The present invention is a fuel cell system including a fuel cell, an injector which is provided in a hydrogen supply channel of the fuel cell and which adjusts a gas state of an upstream side of the hydrogen supply channel to supply a gas toward a downstream side, and a control device which drives and controls the injector. The control device controls an operation of the injector based on a driving state of an associated device including the fuel cell system 1.

10 Claims, 5 Drawing Sheets

FOREIGN PATENT DOCUMENTS

| | | | |
|---|---|---|---|
| JP | 2005-054949 A1 | 3/2005 |
| JP | 2005-129427 A1 | 5/2005 |
| JP | 2005-160127 A1 | 6/2005 |
| JP | 2005-251493 A1 | 9/2005 |
| JP | 2005-302571 A1 | 10/2005 |
| JP | 2005-327635 A1 | 11/2005 |
| JP | 2005327635 A | * 11/2005 |
| JP | 2006-309976 A1 | 11/2006 |
| JP | 2006-179331 A1 | 7/2010 |
| WO | WO/2005/112174 A1 | 11/2005 |
| WO | WO/2004/061344 A1 | 7/2010 |

* cited by examiner

FUEL CELL SYSTEM AND METHOD FOR OPERATING THE SYSTEM

This is a division of application Ser. No. 12/086,770 filed 1 Jul. 2008, which is a 371 national phase application of PCT/JP2006/323866 filed 22 Nov. 2006, which claims priority of Japanese Patent Applications No. 2005-365385 filed 19 Dec. 2005, and No. 2006-285092 filed 19 Oct. 2006, the contents of which are incorporated herein by reference.

TECHNICAL FIELD

The present invention relates to a fuel cell system in which a gas supply channel of a fuel cell is provided with an injector, and a method for operating the system.

BACKGROUND ART

At present, a fuel cell system including a fuel cell which receives supply of a reactive gas (a fuel gas and an oxidizing gas) to generate a power has been suggested and put to practical use. Such a fuel cell system is provided with a fuel supply channel for supplying, to the fuel cell, the fuel gas supplied from a fuel supply source such as a hydrogen tank.

Moreover, in general, the fuel supply channel is provided with a pressure adjustment valve (a regulator) which reduces, to a constant value, a supply pressure of the fuel gas from the fuel supply source, in a case where the supply pressure is remarkably high (e.g., see Japanese Patent Application Laid-Open No. 2004-342386).

DISCLOSURE OF THE INVENTION

However, in a pressure adjustment valve disclosed in Patent Document 1, a supply pressure of a fuel gas is fixed owing to a structure of the valve, so that it is difficult to quickly change the supply pressure of the fuel gas based on an operating situation (i.e., a response property is low), and such precise pressure adjustment as to change a target pressure in multiple stages cannot be performed.

Moreover, in the fuel cell system, a noise level of the whole system is remarkably low even in the operating situation, so that when an operation sound is generated in each operation device, the sound might be a harsh noise, depending on the circumstances. Therefore, there is a demand for a system in which the supply pressure of the fuel gas can appropriately be changed based on an operation state of a fuel cell and in which awareness of a noise can be suppressed.

The present invention has been developed in view of such a situation, and an object thereof is to provide a highly responsive fuel cell system in which a supply pressure of a fuel gas can appropriately be changed based on an operation state of a fuel cell and in which an operator does not easily care about an operation sound, and a method for operating the system.

To achieve the above object, a fuel cell system according to the present invention is a fuel cell system comprising: a fuel cell which receives supply of a gas to generate a power; an injector which is provided in a gas supply channel of the fuel cell and which adjusts a state of the gas on an upstream side of the gas supply channel to supply the gas to a downstream side; and control means for driving and controlling the injector, the control means being configured to control an operation of the injector based on a driving state of an associated device including the fuel cell system.

According to such a constitution, an operation state (an opening rate of a valve body of the injector (a gas passage area), and an opening time of the valve body of the injector (a gas injection time) or the like) can be set based on an operation state of the fuel cell (an amount of a power to be generated by the fuel cell (a power, a current and a voltage), a temperature of the fuel cell, an abnormal state of the fuel cell system, an abnormal state of a fuel cell main body or the like). Therefore, a gas state (a supply pressure) of a fuel gas can appropriately be changed based on the operation state of the fuel cell, so that a response property can be improved.

It is to be noted that the "gas state" is a state (a flow rate, a pressure, a temperature, a molecular concentration or the like) of the gas, and especially includes at least one of the gas flow rate and the gas pressure.

Moreover, the control means controls the operation of the injector based on the driving state of the associated device including the fuel cell system, so that the injector can be operated, for example, in a state in which an operation sound of the injector does not easily become harsh, and it can be prevented that the operation sound of the injector becomes harsh.

The associated device including the fuel cell system corresponds to, for example, a surrounding electronic device including the fuel cell system. In this case, examples of the electronic device include a pump, a motor and a fan. When the fuel cell system is mounted on a mobile body, the electronic device can be interpreted as a traction motor, an inverter, a converter or the like.

The controlling of the operation of the injector is, for example, allowing or limiting (prohibiting) of the operation of the injector, changing of a drive cycle of the injector or the like. For example, a noise frequency due to pulsation of the associated device (e.g., the pump) is matched with a drive frequency of the injector, the injector is operated at a peak of a radiant sound from the associated device, or the operation of the injector is limited (prohibited) in a case where the radiant sound from the associated device has a predetermined value or less.

In the fuel cell system, the control means may control the operation of the injector based on the radiant sound generated in accordance with the driving of the associated device.

When such a constitution is employed, for example, the operation sound of the injector is superimposed on the radiant sound from the associated device, whereby the operation sound of the injector can be hidden or obscured by the radiant sound from the associated device, and it can be prevented that the operation sound of the injector becomes harsh.

As the associated device, for example, a pump which supplies a fluid to the fuel cell can be applied. As the pump, an air compressor which feeds an oxidizing gas under pressure to the fuel cell is applicable.

Moreover, when the fuel cell system is mounted on a mobile body, as the driving state of the associated device, an operation state of a fan for use in cooling the fuel cell or a motor, or a blower for use in blowing air from an air conditioner of a passenger chamber may be applied.

When such a constitution is employed, for example, the operation sound of the injector is superimposed on the radiant sound from the fan or the like, whereby the operation sound of the injector can be hidden or obscured by the radiant sound from the fan or the like, and it can be prevented that the operation sound of the injector becomes harsh.

Moreover, when the fuel cell system is mounted on the mobile body, as the driving state of the associated device, a movement state of the mobile body, for example, a movement speed or an accelerated state may be applied.

In a case where such a constitution is employed, when the movement speed is high, the injector is operated, whereby the operation sound of the injector can be hidden or obscured by a running sound (e.g., noises of tires on a road or a hissing sound), and it can be prevented that this operation sound becomes harsh.

Furthermore, the injector is operated in the accelerated state, that is, an environment during acceleration in which generation of the hissing sound generated in accordance with the movement (the acceleration) of the mobile body, a noise during braking or the like is not easily noticed, whereby it can be prevented that this operation sound becomes harsh. It is to be noted that the accelerated state of the mobile body has correlation with respect to a generated current of the fuel cell, a demanded load (a demanded amount of the power to be generated) from an electric load (e.g., the motor) connected to the fuel cell or an accelerator open rate, so that the operation of the injector may be controlled based on at least one of these factors.

In addition, in the fuel cell system, the control means may control the drive frequency of the injector based on the frequency of the radiant sound from the associated device.

When such a constitution is employed, for example, the drive frequency of the injector is matched with the frequency of the radiant sound from the associated device, or the frequency of the radiant sound from the associated device is set to an integral multiple of the drive frequency of the injector, whereby the operation sound of the injector can be hidden or obscured by the radiant sound from the associated device, and it can be prevented that the operation sound of the injector becomes harsh.

Moreover, for example, a phase of the drive frequency of the injector is appropriately displaced from that of the radiant sound from the associated device, that is, the injector is operated in an environment in which the generation of the noise is not easily noticed, whereby the operation sound of the injector is not noticed, and it can be prevented that the operation sound of the injector becomes harsh.

In the fuel cell system, the control means may change a permissible range of a pressure deviation of the injector based on the driving state of the associated device including the fuel cell system.

To change the permissible range of a pressure deviation, for example, a first control state in which an opening/closing operation of the injector is subjected to feedback control based on a deviation between a detected value of a secondary pressure of the injector and a target control value may be changed to a second control state in which execution of the feedback control is prohibited to raise the pressure to a predetermined target pressure at a time when the secondary pressure of the injector lowers to a predetermined lower limit pressure.

Moreover, to change the permissible range of a pressure deviation, for example, a first control state in which when a deviation between a detected value of a secondary pressure of the injector and a target control value is less than a predetermined value, the deviation is regarded as "0", whereas when the deviation has the predetermined value or more, an opening/closing operation of the injector is subjected to feedback control based on the deviation may be changed to a second state in which the predetermined value is increased as compared with the first control state.

When the permissible range of a pressure deviation is changed as described above, the number of operation times of the injector decreases, and as a result, the generation of the harsh operation sound can be inhibited.

Furthermore, when the fuel cell system is mounted on the mobile body, the control means may change the permissible range of a pressure deviation of the injector only during an idle operation of the mobile body.

When such a constitution is employed, it is possible to reduce the number of the operation times of the injector during an idle operation having high quietness as compared with another operation state.

In a case where the radiant sound generated in accordance with the driving of the associated device is reduced, the control means may prohibit the operation of the injector until a secondary pressure of the injector lowers to a predetermined lower limit pressure.

When such a constitution is employed, the number of the operation times of the injector in a situation where higher quietness is demanded can be reduced.

Moreover, when the secondary pressure of the injector lowers to the lower limit pressure, the control means may allow the operation of the injector to raise the secondary pressure to a predetermined pressure.

When such a constitution is employed, a time from a time when the secondary pressure of the injector raises to the predetermined pressure to a time when the secondary pressure lowers to the lower limit pressure next can be earned, and eventually, the number of the operation times of the injector can be reduced.

The fuel cell system of the present invention is a fuel cell system mounted on a mobile body, comprising: a fuel cell which receives supply of a gas to generate a power; an injector which is provided in a gas supply channel of the fuel cell and which adjusts a state of the gas on an upstream side of the gas supply channel to supply the gas to a downstream side; and control means for controlling an operation of the injector based on a movement state of the mobile body.

Moreover, the injector may include an inner channel which connects an upstream side of the injector to a downstream side thereof, a valve body which is movably arranged in the inner channel and in which an opening area of the inner channel is varied based on a movement position of the valve body, and a valve body driving section which drives the valve body with an electromagnetic driving force.

A method for operating a fuel cell system according to the present invention is a method for operating a fuel cell system including a fuel cell which receives supply of a gas to generate a power and an injector which is provided in a gas supply channel of the fuel cell and which adjusts a state of the gas on an upstream side of the gas supply channel to supply the gas to a downstream side, the method comprising: controlling an operation of the injector based on a driving state of an associated device including the fuel cell system.

According to such a constitution, the injector is operated, for example, in a state in which the operation sound of the injector does not easily become harsh, whereby it can be prevented that the operation sound of the injector becomes harsh.

According to the present invention, there can be provided a highly responsive fuel cell system in which a supply pressure of a fuel gas can appropriately be changed based on an operation state of a fuel cell and in which an operator does not easily care about an operation sound of an injector, and a method for operating the system can also be provided.

BEST MODE FOR CARRYING OUT THE INVENTION

A fuel cell system 1 according to an embodiment of the present invention will hereinafter be described with reference to the drawings. In the present embodiment, an example in which the present invention is applied to a car-mounted power generation system of a fuel cell vehicle (a mobile body) will be described.

First, a constitution of the fuel cell system 1 according to the embodiment of the present invention will be described with reference to FIG. 1.

Figure 1:
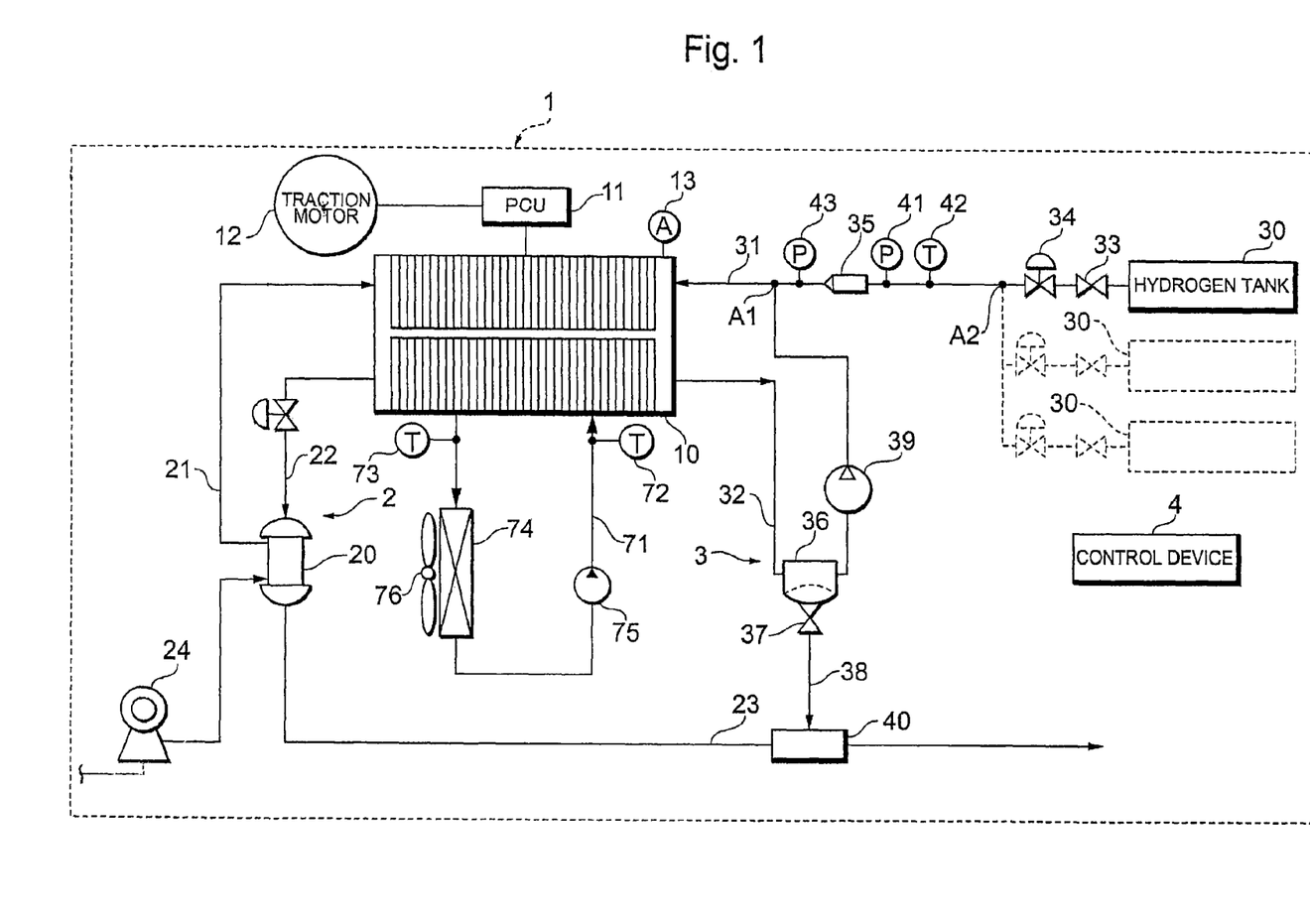
FIG. 1 is a constitution diagram of a fuel cell system according to an embodiment of the present invention.

As shown in FIG. 1, the fuel cell system 1 according to the present embodiment includes a fuel cell 10 which receives supply of a reactive gas (an oxidizing gas and a fuel gas) to generate a power, and the system also includes an oxidizing gas piping system 2 which supplies air as the oxidizing gas to the fuel cell 10, a hydrogen gas piping system 3 which supplies a hydrogen gas as the fuel gas to the fuel cell 10, a control device (control means) 4 which integrally controls the whole system and the like.

The fuel cell 10 has a stack structure in which a required number of unitary cells for receiving the supply of the reactive gas to generate the power are laminated. The power generated by the fuel cell 10 is supplied to a power control unit (PCU) 11. The PCU 11 includes an inverter arranged between the fuel cell 10 and a traction motor 12, a DC-DC converter and the like. Moreover, a current sensor 13 which detects a current during the power generation is attached to the fuel cell 10.

The oxidizing gas piping system 2 includes an air supply channel 21 which supplies the oxidizing gas (air) humidified by a humidifier 20 to the fuel cell 10, an air discharge channel 22 which guides, to the humidifier 20, an oxidizing off gas discharged from the fuel cell 10, and an exhaust channel 23 for guiding the oxidizing off gas from the humidifier 20. The air supply channel 21 is provided with an air compressor 24 which takes the oxidizing gas from atmospheric air to feed the gas under pressure to the humidifier 20.

The hydrogen gas piping system 3 includes a hydrogen tank 30 as a fuel supply source which stores the hydrogen gas having a high pressure (e.g., 70 MPa), a hydrogen supply channel 31 as a fuel supply channel for supplying the hydrogen gas of the hydrogen tank 30 to the fuel cell 10, and a circulation channel 32 for returning, to the hydrogen supply channel 31, a hydrogen off gas discharged from the fuel cell 10. The hydrogen gas piping system 3 is one embodiment of a fuel supply system of the present invention.

It is to be noted that instead of the hydrogen tank 30, a reformer which forms a hydrogen-rich reformed gas from a hydrocarbon-based fuel, and a high-pressure gas tank which brings the reformed gas formed by this reformer into a high-pressure state to accumulate the pressure may be employed as the fuel supply source. Alternatively, a tank having a hydrogen occluded alloy may be employed as the fuel supply source.

The hydrogen supply channel 31 is provided with a shut valve 33 which shuts or allows the supply of the hydrogen gas from the hydrogen tank 30, a regulator 34 which adjusts the pressure of the hydrogen gas, and an injector 35. On an upstream side of the injector 35, a primary pressure sensor 41 and a temperature sensor 42 which detect a pressure and a temperature of the hydrogen gas in the hydrogen supply channel 31, respectively, are provided. Furthermore, on a downstream side of the injector 35 which is an upstream side of a joining portion of the hydrogen supply channel 31 and the circulation channel 32, there is provided a secondary pressure sensor 43 which detects a pressure of the hydrogen gas in the hydrogen supply channel 31.

The regulator 34 is a device which adjusts an upstream pressure (a primary pressure) of the regulator into a beforehand set secondary pressure. In the present embodiment, a mechanical pressure reduction valve which reduces the primary pressure is employed as the regulator 34. As a constitution of the mechanical pressure reduction valve, a known constitution may be employed which has a housing provided with a back pressure chamber and a pressure adjustment chamber formed via a diaphragm and in which the primary pressure is reduced into a predetermined pressure owing to a back pressure of the back pressure chamber to form a secondary pressure in the pressure adjustment chamber.

In the present embodiment, as shown in FIG. 1, two regulators 34 are arranged on the upstream side of the injector 35, whereby the upstream pressure of the injector 35 can effectively be reduced. Therefore, a degree of freedom in design of a mechanical structure (a valve body, a housing, a channel, a driving device and the like) of the injector 35 can be raised.

Moreover, the upstream pressure of the injector 35 can be reduced, so that it can be prevented that the valve body of the injector 35 does not easily move owing to increase of a pressure difference between the upstream pressure and a downstream pressure of the injector 35. Therefore, a variable pressure adjustment range of the downstream pressure of the injector 35 can be broadened, and lowering of a response property of the injector 35 can be inhibited.

The injector 35 is an electromagnetic driving type opening/closing valve in which the valve body is directly driven with an electromagnetic driving force in a predetermined drive cycle and disposed away from a valve seat, whereby a gas state such as a gas flow rate or a gas pressure can be adjusted. The injector 35 includes the valve seat having an injection hole which injects a gas fuel such as the hydrogen gas, and also includes a nozzle body which supplies and guides the gas fuel to the injection hole, and the valve body movably received and held in an axial direction (a gas flow direction) with respect to this nozzle body to open and close the injection hole.

In the present embodiment, the valve body of the injector 35 is driven by a solenoid which is an electromagnetic driving device, and a pulse-like excitation current supplied to this solenoid can be turned on or off to switch an opening area of each injection hole in two stages, multiple stages, a continuous (stepless) manner or a linear manner.

A gas injection time and a gas injection timing of the injector 35 are controlled based on a control signal output from the control device 4, whereby a flow rate and a pressure of the hydrogen gas are precisely controlled. In the injector 35, the valve (the valve body and the valve seat) is directly driven with the electromagnetic driving force to open or close, and a drive cycle of the valve can be controlled into a highly responsive region, so that the injector has a high response property.

In the injector 35, to supply the gas with a demanded flow rate to the downstream side of the injector, at least one of an opening area (an open rate) and an opening time of the valve body provided in a gas channel of the injector 35 is changed, whereby a flow rate (or a hydrogen molecular concentration) of the gas to be supplied to the downstream side (a fuel cell 10 side) is adjusted.

It is to be noted that the valve body of the injector 35 is opened or closed to adjust the gas flow rate, and the pressure of the gas to be supplied to the downstream side of the injector 35 is reduced as compared with the gas pressure on the upstream side of the injector 35, so that the injector 35 can be interpreted as a pressure adjustment valve (a pressure reduction valve, a regulator). Moreover, in the present embodiment, the injector can be interpreted as a variable pressure adjustment valve capable of changing an adjustment amount (a reduction amount) of the upstream gas pressure of the injector 35 so that the pressure meets a demanded pressure in a predetermined pressure range based on a gas demand.

It is to be noted that in the present embodiment, as shown in FIG. 1, the injector 35 is arranged on the upstream side of a joining portion A1 of the hydrogen supply channel 31 and the circulation channel 32. Moreover, as shown by broken lines in FIG. 1, in a case where a plurality of hydrogen tanks 30 are employed as a fuel supply source, the injector 35 is arranged on the downstream side of a portion (a hydrogen gas joining portion A2) in which the hydrogen gases supplied from the hydrogen tanks 30 are joined.

The circulation channel 32 is connected to a discharge channel 38 via a gas-liquid separator 36 and an exhaust discharge valve 37. The gas-liquid separator 36 collects a water content from the hydrogen off gas. The exhaust discharge valve 37 operates based on a command from the control device 4 to discharge (purge), from the system, the water content collected by the gas-liquid separator 36 and the hydrogen off gas including impurities in the circulation channel 32.

Moreover, the circulation channel 32 is provided with a hydrogen pump 39 which pressurizes the hydrogen off gas in the circulation channel 32 to feed the gas toward the hydrogen supply channel 31. It is to be noted that the gas in the discharge channel 38 is diluted by a diluter 40 to join the gas in the exhaust channel 23. It is to be noted that the hydrogen off gas discharged via the exhaust discharge valve 37 and the discharge channel 38 is diluted by the diluter 40 to join an oxidizing off gas in the exhaust channel 23.

The control device 4 detects an operation amount of an acceleration operating device (an accelerator or the like) provided in a vehicle, and receives control information such as a demanded acceleration value (e.g., a demanded power generation amount from a load device such as the traction motor 12) to control operations of various units in the system.

It is to be noted that the load device is a generic power consumption device including, in addition to the traction motor 12, an auxiliary device (e.g., the compressor 24, the hydrogen pump 39, a motor of a cooling pump or the like) required for operating the fuel cell 10, an actuator for use in any type of device (a change gear, a wheel control device, a steering device, a suspension device or the like) associated with running of the vehicle, an air conditioning device (an air conditioner) of a passenger space, illumination or audio.

Among these devices or attached devices, a device which generates a radiant sound in accordance with driving corresponds to an associated device of the present invention, but the device is not limited to an illustrated device.

The control device 4 is constituted of a computer system (not shown). Such a computer system is constituted of a CPU, a ROM, a RAM, a HDD, an input/output interface, a display and the like, and the CPU reads any type of control program recorded in the ROM to execute the program, whereby various control operations are realized.

Figure 2:
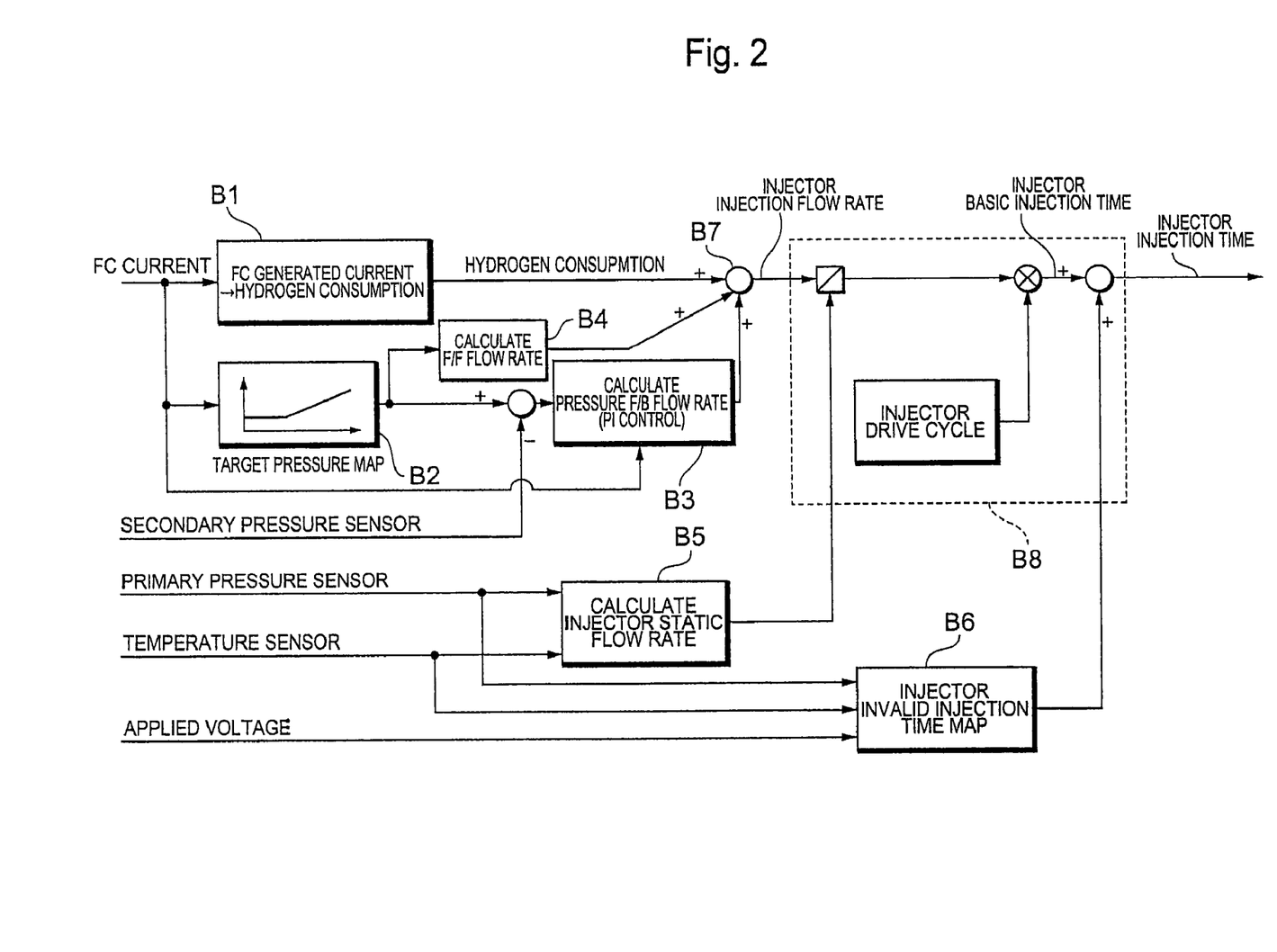
FIG. 2 is a control block diagram showing a control configuration of a control device of a fuel cell system shown in FIG. 1.

Specifically, as shown in FIG. 2, the control device 4 calculates an amount (hereinafter referred to as the "hydrogen consumption") of the hydrogen gas consumed by the fuel cell 10 based on an operation state of the fuel cell 10 (a current value during power generation of the fuel cell 10 detected by the current sensor 13) (a fuel consumption calculating function: B1). In the present embodiment, the hydrogen consumption is calculated and updated for each calculation cycle of the control device 4 by use of a specific calculation formula indicating a relation between the current value of the fuel cell 10 and the hydrogen consumption.

Moreover, the control device 4 calculates a target pressure value (a target gas supply pressure with respect to the fuel cell 10) of the hydrogen gas in a downstream position of the injector 35 based on the operation state of the fuel cell 10 (the current value of the fuel cell 10 during the power generation detected by the current sensor 13) (a target pressure value calculating function: B2). In the present embodiment, the target pressure value in a position where the secondary pressure sensor 43 is arranged (a pressure adjustment position as a position where pressure adjustment is demanded) is calculated and updated for each calculation cycle of the control device 4 by use of a specific map indicating a relation between the current value of the fuel cell 10 and the target pressure value.

Furthermore, the control device 4 calculates a feedback correction flow rate based on a deviation between the calculated target pressure value and a detected pressure value in the downstream position (the pressure adjustment position) of the injector 35 detected by the secondary pressure sensor 43 (a feedback correction flow rate calculating function: B3). The feedback correction flow rate is a hydrogen gas flow rate (a pressure difference reducing correction flow rate) to be added to the hydrogen consumption in order to reduce the deviation between the target pressure value and the detected pressure value. In the present embodiment, the feedback correction flow rate is calculated and updated for each calculation cycle of the control device 4 by use of a target follow-up type control of PI control or the like.

In addition, the control device 4 calculates a feed forward correction flow rate corresponding to a deviation between the previously calculated target pressure value and the presently calculated target pressure value (a feed forward correction flow rate calculating function: B4). The feed forward correction flow rate is a fluctuation (a pressure difference corresponding correction flow rate) of the hydrogen gas flow rate due to a fluctuation of the target pressure value. In the present embodiment, the feed forward correction flow rate is calculated and updated for each calculation cycle of the control device 4 by use of a specific calculation formula indicating a relation between the deviation of the target pressure value and the feed forward correction flow rate.

Moreover, the control device 4 calculates an upstream static flow rate of the injector 35 based on an upstream gas state of the injector 35 (a hydrogen gas pressure detected by the primary pressure sensor 41 and a hydrogen gas temperature detected by the temperature sensor 42) (a static flow rate calculating function: B5). In the present embodiment, a static flow rate is calculated and updated for each calculation cycle of the control device 4 by use of a specific calculation formula indicating a relation between the upstream hydrogen gas pressure and temperature of the injector 35 and the static flow rate.

Furthermore, the control device 4 calculates an invalid injection time of the injector 35 based on the upstream gas state (the pressure and the temperature of the hydrogen gas) of the injector 35 and the applied voltage (an invalid injection time calculating function: B6). Here, the invalid injection time is a time required from a time when the injector 35 receives a control signal from the control device 4 to a tome when injecting is actually started. In the present embodiment, the invalid injection time is calculated and updated for each calculation cycle of the control device 4 by use of a specific map indicating a relation among the pressure and temperature of the hydrogen gas on the upstream side of the injector 35, the applied voltage and the invalid injection time.

In addition, the control device 4 adds up the hydrogen consumption, the feedback correction flow rate and the feed forward correction flow rate to calculate an injection flow rate of the injector 35 (an injection flow rate calculating function: B7). Subsequently, the control device 4 multiplies, by a drive cycle of the injector 35, a value obtained by dividing the injection flow rate of the injector 35 by the static flow rate to calculate a basic injection time of the injector 35, and adds up this basic injection time and the invalid injection time to calculate a total injection time of the injector 35 (a total injection time calculating function: B8). Here, the drive cycle is a stepped (on/off) waveform-like period indicating an opening/closing state of the injection hole of the injector 35. In the present embodiment, the control device 4 sets the drive cycle to a constant value.

Then, the control device 4 outputs a control signal for realizing the total injection time of the injector 35 calculated through the above-mentioned procedure, whereby the gas injection time and the gas injection timing of the injector 35 are controlled to adjust the flow rate and the pressure of the hydrogen gas to be supplied to the fuel cell 10.

During a usual operation of the fuel cell system 1, the hydrogen gas is supplied from the hydrogen tank 30 to a fuel electrode of the fuel cell 10 via the hydrogen supply channel 31, and the humidified and adjusted air is supplied to an oxidation electrode of the fuel cell 10 via the air supply channel 21, to generate a power. In this case, a power (a demanded power) to be extracted from the fuel cell 10 is calculated by the control device 4, and the hydrogen gas and air are supplied into the fuel cell 10 as much as amounts corresponding to the amount of the generated power. In the present embodiment, a pressure of the hydrogen gas to be supplied to the fuel cell 10 during such a usual operation is precisely controlled.

Figure 3:
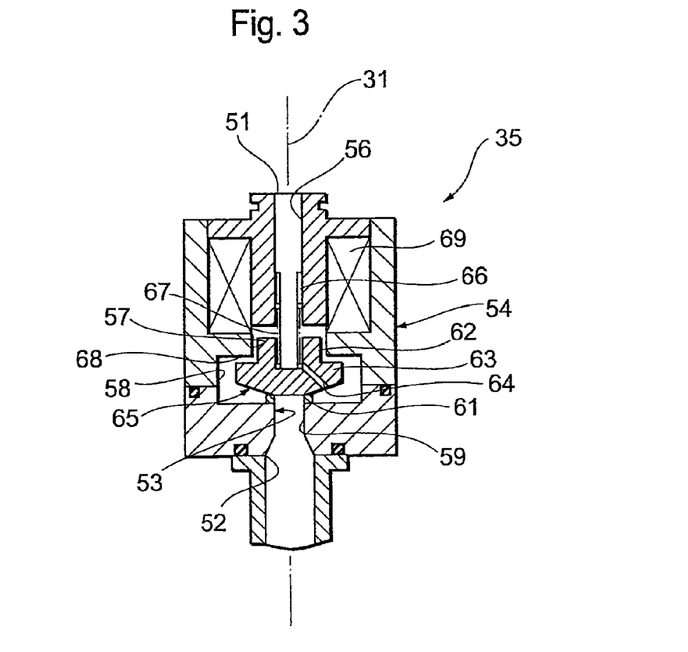
FIG. 3 is a sectional view of an injector of the fuel cell system shown in FIG. 1.

The above-mentioned injector 35 has a structure shown in FIG. 3, and has a metal-made cylinder 54 constituting a part of the hydrogen supply channel (a gas supply channel) 31 and provided with an inner channel 53 having one port portion 51 arranged on the side of the hydrogen tank 30 of the hydrogen supply channel 31 and the other port portion 52 arranged on the side of the fuel cell 10 of the hydrogen supply channel 31. This cylinder 54 is provided with a first passage portion 56 connected to the port portion 51, a second passage portion 57 connected to a side of this first passage portion 56 opposite to the port portion 51 and having a diameter larger than that of the first passage portion 56, a third passage portion 58 connected to a portion of this second passage portion 57 opposite to the first passage portion 56 and having a diameter larger than that of the second passage portion 57, and a fourth passage portion 59 connected to a portion of the third passage portion 58 opposite to the second passage portion 57 and having a diameter smaller than that of the second passage portion 57 and the third passage portion 58, and these portions constitute the inner channel 53.

Moreover, the injector 35 has a valve seat 61 constituted of a sealable member provided so as to surround an opening of the fourth passage portion 59 on the side of the third passage portion 58; a metal-made valve body 65 having a cylindrical portion 62 movably inserted into the second passage portion 57 and a bevel portion 63 having a diameter larger than that of the second passage portion 57 arranged in the third passage portion 58, the bevel portion 63 being provided with an oblique communication hole 64; a spring 67 having one end inserted into the cylindrical portion 62 of the valve body 65 and the other end engaged with a stopper 66 formed in the first passage portion 56 to allow the valve body 65 to abut on the valve seat 61, thereby blocking the inner channel 53; and a solenoid (an electromagnetic driving device, a valve body driving section) 69 which moves the valve body 65 against an urging force of the spring 67 until the valve body abuts on a stepped portion 68 of the third passage portion 58 on the second passage portion 57 side, whereby the valve body 65 is disposed away from the valve seat 61 to connect the inner channel 53 in the communication hole 64.

As described above, in the injector 35, during driving for connecting the inner channel 53, the metal-made valve body 65 moves in the metal-made cylinder 54 to abut on the stepped portion 68 of the cylinder 54, so that an operation sound is generated. Such an operation sound becomes harsh for an operator such as a driver or a passenger as the case may be. In particular, the injector 35 of the present embodiment is a gas state variable supply device of an electromagnetic driving system driven at a high frequency, so that the operation sound of the injector is a remarkable noise.

To solve the problem, in the present embodiment, while satisfying the above-mentioned control conditions, the control device 4 drives and controls the injector 35 in accordance with a driving state of an associated device as follows. For example, the control device drives and controls the injector 35 in accordance with an operation state of the air compressor (the associated device, a pump) 24 as one of the auxiliary devices. That is, the air compressor 24 generates pulsation of suction and discharge to generate the operation sound (a radiant sound) corresponding to the pulsation.

Specifically, in a root type air compressor, a rotary fourth or eighth operation sound is generated at a frequency of 40 Hz during 1600 rotations, at a frequency of 80 Hz during 1200 rotations, and at a frequency of 120 Hz during 1800 rotations. In a scroll type air compressor, a rotary primary operation sound is generated at a frequency of 10 Hz during 1600 rotations, at a frequency of 20 Hz during 1200 rotations, and at a frequency of 30 Hz during 1800 rotations. In a screw type air compressor using four-tooth rotor and six-tooth rotor, a rotary sixth operation sound is generated at a frequency of 60 Hz during 1600 rotations, at a frequency of 120 Hz during 1200 rotations, and at a frequency of 180 Hz during 1800 rotations. Therefore, the injector 35 is driven at a frequency of, for example, about 100 Hz or less based on such a frequency of the operation sound of the air compressor 24.

In a case where the drive frequency of the injector 35 is controlled based on the frequency of the operation sound accompanying the pulsation of the air compressor 24 indicating the operation state of the air compressor 24, for example, the frequency (a noise frequency due to pump pulsation) of the operation sound of the air compressor 24 including a phase is manufactured with the drive frequency of the injector 35.

Figure 4:
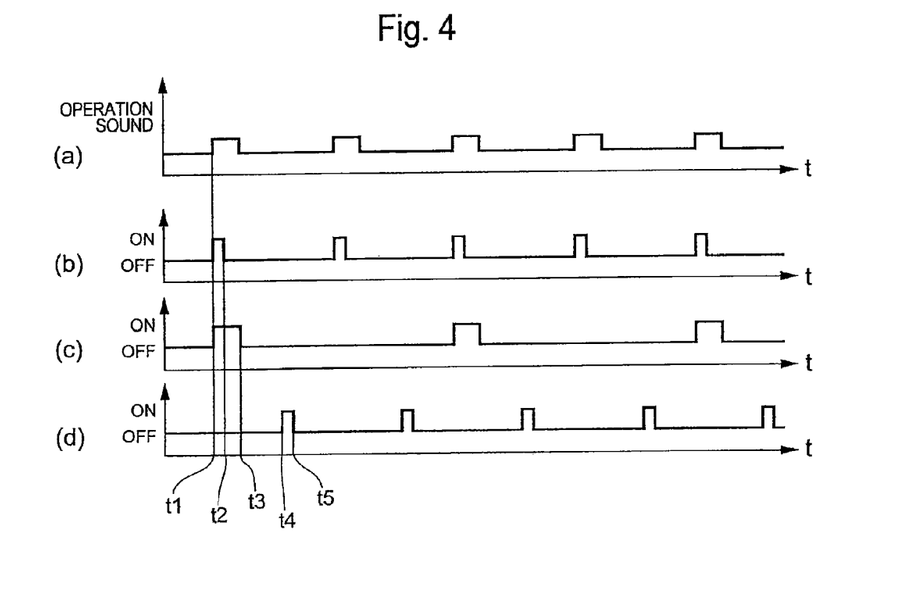
FIG. 4 is a time chart showing the control configuration of the control device of the fuel cell system shown in FIG. 1.

That is, in a case where the operation sound of the air compressor 24 is generated at a frequency shown in FIG. 4(*a*), as shown in FIG. 4(*b*), at a peak of the operation sound of the air compressor 24, the injector 35 is driven at a timing t1 of rising of the operation sound of the air compressor 24, and the driving of the injector 35 is stopped at a timing t2 before a noise level of the air compressor 24 lowers.

That is, the drive frequency of the injector 35 is matched with the frequency of the operation sound of the air compressor 24, whereby the valve of the injector 35 can be opened while the sound of the air compressor 24 is emitted. In consequence, the operation sound of the injector 35 is muffled by the operation sound of the air compressor 24 which emits a larger operation sound, and could not be heard by the passenger. Here, in a case where the injector 35 is driven at a rising timing of the operation sound of the air compressor 24, the noise of the injector 35 during the driving when the noise is largest can more effectively be muffled.

Moreover, when the drive frequency of the injector 35 is controlled based on the frequency of the operation sound of the air compressor 24, the frequency of the operation sound of the air compressor 24 is set to an integral multiple of the drive frequency of the injector 35, and the phases are matched.

That is, as shown in FIG. 4(c), control is performed every other generation of the operation sound of the air compressor 24 so that at the peak of the operation sound of the air compressor 24, the injector 35 is driven at the rising timing t1 of the operation sound of the air compressor 24, and the driving of the injector 35 is stopped at a lowering timing t3 of the operation sound of the air compressor 24. At this time, while the sound of the air compressor 24 is emitted, the valve of the injector 35 is kept to open, whereby an injection amount is increased.

In consequence, the injector 35 can be driven so that the frequency of the operation sound of the air compressor 24 becomes the integral multiple (double in FIG. 4(c)) of the drive frequency of the injector 35, whereby the operation sound of the injector 35 can be hidden or obscured by the operation sound of the air compressor 24 in the same manner as described above, and it can be prevented that the operation sound of the injector 35 becomes harsh. In addition, the number of the driving times of the injector 35 can be reduced, and it can further be prevented that the operation sound of the injector 35 becomes harsh.

Furthermore, in a case where the drive frequency of the injector 35 is controlled based on the frequency of the operation sound of the air compressor 24, for example, the frequency of the operation sound of the air compressor 24 is set to be equal to the drive frequency of the injector 35, and the phases are appropriately displaced. For example, as shown in FIG. 4(d), for example, the phase of the drive frequency of the injector 35 is displaced from that of the operation sound of the air compressor 24 so that the operation sound is generated between peak generation intervals (t4 and t5) of the operation sound of the air compressor 24.

As described above, the injector 35 is operated so that the operation sound is periodically stably generated together with the operation sound of the air compressor 24. That is, the injector 35 can be operated in an environment in which the generation of the noise is not easily noticed, whereby the operation sound of the injector 35 is not cared, and it can be prevented that the operation sound of the injector 35 becomes harsh.

It is to be noted that the injector 35 may be driven so that the operation sound is generated between the generation intervals of the operation sound of the air compressor 24, but the injector may be driven substantially in the center of the intervals as long as the operation sound of the air compressor 24 is eliminated.

Moreover, when the operation sound of the air compressor 24 is small, for example, when a vehicle speed is less than a predetermined value and/or when the generated current of the fuel cell 10 is less than a predetermined value as in an idle operation, a load demand (demanded power generation) with respect to the fuel cell 10 is small. Even when the pressures of the hydrogen gas and air slightly change, the power generation stability is not influenced. In consequence, the operation of the injector 35 can be prohibited (limited) in such a driven state of the air compressor 24.

That is, when the operation sound of the air compressor 24 has a predetermined value or less, the injecting of the injector 35 is prohibited, whereas when the operation sound of the air compressor 24 exceeds the predetermined value, the injector is driven as usual, whereby the operation sound of the injector 35 can be muffled by the operation sound of the air compressor 24. Such a noise countermeasure is especially effective in a situation in which quietness is relatively high as in the idle operation, as compared with another operation state.

However, the prohibition of the injecting of the injector 35 cannot be continued to be maintained. Therefore, when the operation sound of the air compressor 24 has the predetermined value or less, the secondary pressure sensor 43 to detect the pressure of the hydrogen gas in the hydrogen supply channel 31 is monitored. In a case where the pressure of the hydrogen gas in the hydrogen supply channel 31 detected by the secondary pressure sensor 43 is a predetermined pressure or less, during such control as to drive the injector 35, the control is loosened so that a permissible range of a pressure deviation of the hydrogen gas in the hydrogen supply channel 31 detected by the secondary pressure sensor 43 enlarges as much as possible.

As an example in which the control is loosened so as to enlarge this permissible range of a pressure deviation, first, a first control state in which an opening/closing operation of the injector 35 is subjected to feedback control based on a pressure deviation between a present value (a detected value) of a secondary pressure detected by the secondary pressure sensor 43 and a target value (a target control value) as in usual control is sometimes changed to a second control state in which when execution of such feedback control is daringly prohibited to raise the secondary pressure to a predetermined target pressure at a time when the secondary pressure of the injector 35 is lowered to a predetermined lower limit pressure.

Moreover, as a second example, a first control state in which when the pressure deviation between the present value (the detected value) of the detected secondary pressure of the injector 35 and the target value (the target control value) is less than the predetermined value, the deviation is regarded as "0", whereas when the deviation has the predetermined value or more, the opening/closing operation of the injector 35 is subjected to the feedback control is sometimes changed to a second state in which the predetermined value is increased as compared with the first control state, in other words, a dead zone in which the pressure deviation is forcibly regarded as "0" is broadened.

Furthermore, as a third example, a first control state in which an opening/closing operation of the injector 35 is controlled so that a drive cycle (a basic period) of the injector 35 is constant is sometimes changed to a second control state in which an injection amount of the injector 35 per drive cycle is forcibly increased (or an injection time is lengthened) as compared with this first control state.

Then, as a fourth example, a first control state in which the opening/closing operation of the injector 35 is controlled so that an injection amount or an injection time of the injector 35 per one drive cycle (a basic period) becomes constant is sometimes changed to a second control state in which the one drive cycle (the basic period) is forcibly lengthened as compared with the first control state.

Figure 5:
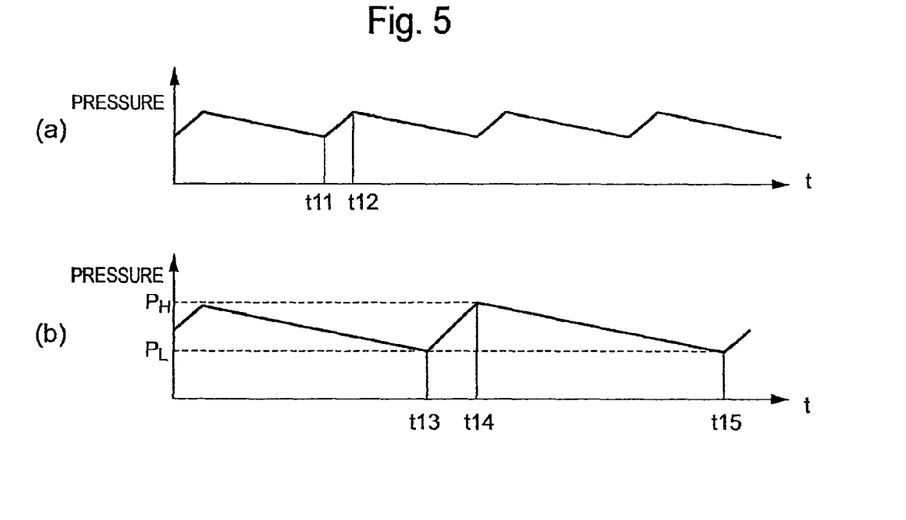
FIG. 5 is a time chart showing the control configuration of the control device of the fuel cell system shown in FIG. 1.

Next, for example, the first example will specifically be described. During normal control shown in FIG. 5(a), the injector 35 is driven (injected) between time t11 and t12 based on the pressure deviation between the present value and the target value. With this driving, the pressure of the hydrogen gas in the hydrogen supply channel 31 rises as shown in the drawing. On the other hand, in the first example shown in FIG. 5(b), the injector 35 is not driven as a result of the feedback control based on the above-mentioned pressure deviation, till time t13 when the pressure of the hydrogen gas in the hydrogen supply channel 31 lowers to a predetermined lower limit value $P_L$. However, the hydrogen gas pressure lowers to the lower limit value $P_L$, the injector 35 is driven between the time t13 and t14.

Then, when the pressure of the hydrogen gas in the hydrogen supply channel 31 during this driving (t13 and t14) is raised as much as possible (raised to, for example, a predetermined upper limit value (a predetermined target pressure) $P_H$), a time t15 can be earned until the pressure next lowers to the predetermined lower limit value $P_L$ to restart driving the injector 35. Therefore, the number of emissions of the operation sound of the injector 35 can be reduced, and it can be prevented that the operation sound becomes harsh.

Even in this case, when the operation sound of the air compressor 24 exceeds the predetermined value, the injector 35 is driven as usual, whereby the operation sound of the injector 35 can be muffled by the operation sound of the air compressor 24.

Figure 6:
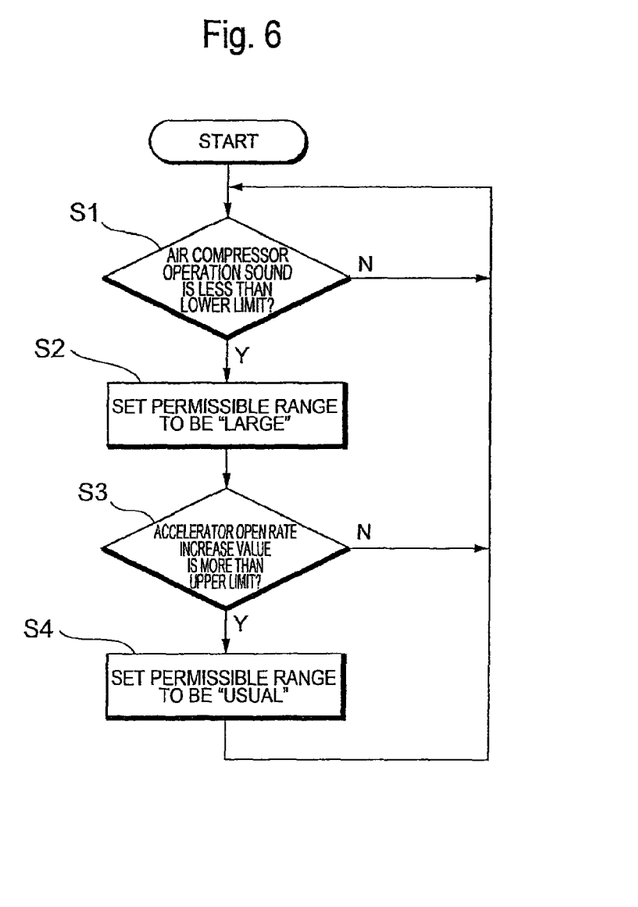
FIG. 6 is a flow chart showing an operation method of the fuel cell system shown in FIG. 1.

As described above, when the operation sound of the air compressor 24 is small, that is, as shown in FIG. 6, when the operation sound of the air compressor 24 is smaller than a predetermined lower limit value (step S1), control is loosened so as to enlarge the permissible range of a pressure deviation as much as possible (step S2). In a case where the number of the driving times of the injector 35 is reduced, when an accelerator open rate per unit time is increased in excess of a predetermined upper limit value (step S3: YES), the permissible range of a pressure deviation is set to a usual setting (step S4), and the injecting of the injector 35 may be performed as usual.

That is, the control of the step S2 in which the permissible range of a pressure deviation is set to be large based on the accelerator open rate may be released. In this case, drop of the gas pressure during vehicle acceleration can be prevented, and an acceleration response property and a product property can be improved. Needless to say, even in a case where the driving of the injector 35 is prohibited at a time when the operation sound of the air compressor 24 is small, the prohibition can be released based on the accelerator open rate.

It is to be noted that during the usual control, as described above, the feedback control is performed based on the pressure deviation obtained by "the present value minus the target value" of the detected secondary pressure of the injector 35, and the value is brought close to the target value as much as possible while changing the target control value. However, as described above, when the operation sound of the air compressor 24 is small, the load demand (the power generation demand) of the fuel cell 10 is small. It is sometimes assumed that even when the pressures of the hydrogen gas and the air slightly change, the power generation stability is not influenced. To solve the problem, in such a case, the control state may be shifted from a usual control time as the first control state to the second control state in which a pressure control range is broadened as compared with the usual control time.

For example, in a case where an absolute value of the pressure deviation is a predetermined value or less while a target pressure adjustment width is maximized, the dead zone in which the pressure deviation is regarded as "0" is enlarged, and the pressure control range is broadened as compared with the usual control, whereby an effect similar to the above effect can be obtained. This example corresponds to the second example in which the control is loosened so as to enlarge the permissible range of a pressure deviation.

Furthermore, a magnitude of the operation sound of the air compressor 24 substantially has a proportionality relation with respect to the vehicle speed, so that the vehicle speed may be applied instead of the operation sound of the air compressor 24, and the operation of the injector 35 can be controlled based on this vehicle speed. That is, when the vehicle speed is low, the operation sound of the air compressor 24 is small, and a running sound is small. Therefore, in a case where the vehicle speed has a predetermined value or less, the injecting of the injector 35 is prohibited, or the control is loosened so as to enlarge the permissible range of a pressure deviation as much as possible, thereby reducing the number of the injecting times of the injector 35.

On the other hand, when the vehicle speed increase, the magnitude of the operation sound of the air compressor 24 enlarges, and a running sound such as a noise of a tire on a road or a hissing sound enlarges. Therefore, even in a case where the vehicle speed exceeds the predetermined value and the injector 35 is driven as usual, the operation sound of the injector 35 can be muffled by the operation sound or the running sound of the air compressor 24. Therefore, it can be prevented that this operation sound becomes harsh.

The vehicle speed substantially has a proportionality relation with respect to the number of the injecting times of the injector 35 and the number of the rotations of the air compressor 24, so that there is a merit that cooperative control is easily performed. It is to be noted that it is determined, depending on the vehicle, whether the running sound or the operation sound of the air compressor 24 is large, so that it can be selected whether the operation sound of the injector 35 is muffled mainly by the running sound or the operation sound of the air compressor 24, depending on the vehicle.

Moreover, examples of the vehicle auxiliary device which can generate such a comparatively large operation sound as to muffle the driving sound of the injector 35 include the air compressor 24, additionally a blower which blows air from an air conditioner (an air conditioning device) in a vehicle chamber, or a radiator fan which cools cooling water for the fuel cell 10 outside the vehicle chamber. Therefore, the operation of the injector 35 may be controlled in the same manner as described above based on operation states of these devices instead of the air compressor 24, that is, an operation sound (a blowing sound) of the blower of the air conditioner or an operation sound of the radiator fan. However, the operation sound of the air compressor 24 is usually largest, so that the injector may be controlled in accordance with an operating situation of the air compressor 24.

Furthermore, the magnitude of the operation sound of the air compressor 24 substantially has a proportionality relation with respect to the generated current of the fuel cell 10, and also substantially has a proportionality relation with respect to the demanded load of the motor, that is, the accelerator open rate (an accelerated/decelerated state), so that the accelerator open rate is applied instead of the operation sound of the air compressor 24, and the operation of the injector 35 may be controlled based on this accelerator open rate.

That is, when the accelerator open rate is small, the operation sound of the air compressor 24 is small, so that in a case where the accelerator open rate has a predetermined value or less, the injecting of the injector 35 is prohibited, or the control is loosened so as to enlarge the permissible range of a pressure deviation as much as possible, thereby reducing the number of the injecting times of the injector 35.

On the other hand, when the accelerator open rate increases, the magnitude of the operation sound of the air compressor 24 enlarges. Therefore, even in a case where the injector 35 is driven as usual at a time when the accelerator open rate exceeds the predetermined value, the operation sound of the injector 35 can be muffled by the operation sound of the air compressor 24.

Therefore, it can be prevented that this operation sound becomes harsh. The accelerator open rate substantially has a proportionality relation with respect to the number of the injecting times of the injector 35 and the number of the rotations of the air compressor 24, so that there is a merit that the cooperative control is easily performed.

It is to be noted that in a hybrid system provided with two power sources including the fuel cell 10 and a battery, the generated current of the fuel cell 10 sometimes does not have any proportional relation with respect to the demanded load of the motor, that is, the accelerator open rate. However, even in this case, when the accelerator open rate is large, that is, the injector 35 is operated in an environment during acceleration where the generation of the noise is not easily cared, whereby it can be prevented that this operation sound becomes harsh.

It is to be noted that the above-mentioned control is performed after completion of warm-up of the fuel cell 10 (after releasing of output limitation). This is because before the warm-up, any power generation robust property with respect to the pressure is not seen in the fuel cell 10, and it is difficult to apply the control.

In the fuel cell system 1 described above according to the present embodiment, the operation state (the injection time) of the injector 35 can be set based on the operation state (the current value during the power generation) of the fuel cell 10. Therefore, the supply pressure of the hydrogen gas can appropriately be changed based on the operation state of the fuel cell 10, and a response property can be improved. Moreover, the injector 35 is employed as a flow rate adjustment valve of the hydrogen gas and a variable pressure adjustment valve, so that precise pressure adjustment (adjustment of the supply pressure of the hydrogen gas to the fuel cell 10) can be performed.

That is, the injector 35 can receive the control signal from the control device 4 based on the operation state of the fuel cell 10 to adjust the injection time and the injection timing of the hydrogen gas, so that the pressure adjustment can more quickly and exactly be performed as compared with a conventional mechanical variable pressure adjustment valve. Moreover, the injector 35 is small-sized, light-weighted and inexpensive as compared with the conventional mechanical variable pressure adjustment valve, so that the whole system that is miniaturized and inexpensive can be realized.

Moreover, in the fuel cell system 1 according to the above-mentioned embodiment, the control device 4 controls the operation of the injector 35 based on the driving state of the associated device, so that the injector 35 can be operated in a state in which, for example, the operation sound of the injector 35 does not easily become harsh, and it can be prevented that the operation sound of the injector 35 becomes harsh.

That is, the control device 4 controls the operation of the injector 35 based on the operation state of the air compressor 24, whereby, for example, the operation sound of the injector 35 is superimposed on the operation sound of the air compressor 24. In consequence, the operation sound of the injector 35 can be hidden or obscured by the operation sound of the air compressor 24, and it can be prevented that the operation sound of the injector 24 becomes harsh.

The control device 4 may control the operation of the injector 35 based on the operation state of the air conditioner. In this case, for example, when the operation sound of the injector 35 is superimposed on the operation sound of the air conditioner, the operation sound of the injector 35 can be hidden or obscured by the operation sound of the air conditioner, so that it can be prevented that the operation sound of the injector 35 becomes harsh.

Moreover, the control device 4 may control the operation of the injector 35 based on the operation state of the radiator fan. In this case, for example, when the operation sound of the injector 35 is superimposed on the operation sound of the radiator fan, the operation sound of the injector 35 can be hidden or obscured by the operation sound of the radiator fan, so that it can be prevented that the operation sound of the injector 35 becomes harsh.

Furthermore, in the fuel cell system 1 according to the above-mentioned embodiment, in a case where the system is mounted on a mobile body, the control device 4 can control the operation of the injector 35 based on the vehicle speed. Therefore, for example, when the vehicle speed is high, the injector 35 is operated, whereby the operation sound of the injector 35 can be hidden or obscured by the running sound of the mobile body, and it can be prevented that this operation sound becomes harsh.

In addition, in the fuel cell system 1 according to the above-mentioned embodiment, in a case where the system is mounted on the mobile body, the control device 4 can control the operation of the injector 35 based on the accelerator open rate (the accelerated/decelerated state), so that the injector 35 is operated, for example, at a time when the accelerator open rate is large, that is, in an environment during the acceleration where the generation of the noise is not easily cared. In consequence, it can be prevented that this operation sound becomes harsh.

Moreover, in the fuel cell system 1 according to the above-mentioned embodiment, the control device 4 can control the drive frequency of the injector 24 based on the frequency of the operation sound of the air compressor 24 as the auxiliary device, so that, for example, the drive frequency of the injector 35 is matched with the frequency of the operation sound of the air compressor 24, or the frequency of the operation sound of the air compressor 24 is set to the integral multiple of the drive frequency of the injector 35. In consequence, the operation sound of the injector 35 can be hidden or obscured by the operation sound of the air compressor 24, whereby it can be prevented that the operation sound of the injector 35 becomes harsh.

Furthermore, the injector 35 is operated, for example, in a case where the phase of the drive frequency of the injector 35 is appropriately displaced from the phase of the operation sound of the air compressor 24, that is, in the environment where the generation of the noise is not easily cared. In consequence, the operation sound of the injector 35 is not noticed, and it can be prevented that the operation sound of the injector 35 becomes harsh.

It is to be noted that in the above embodiment, the injector has been described in accordance with an example of the injector provided in the hydrogen supply channel 31 of the fuel cell system. However, the present invention is applicable to any other injector as long as the injector is provided in the gas supply channel of the fuel cell system.

Figure 7:
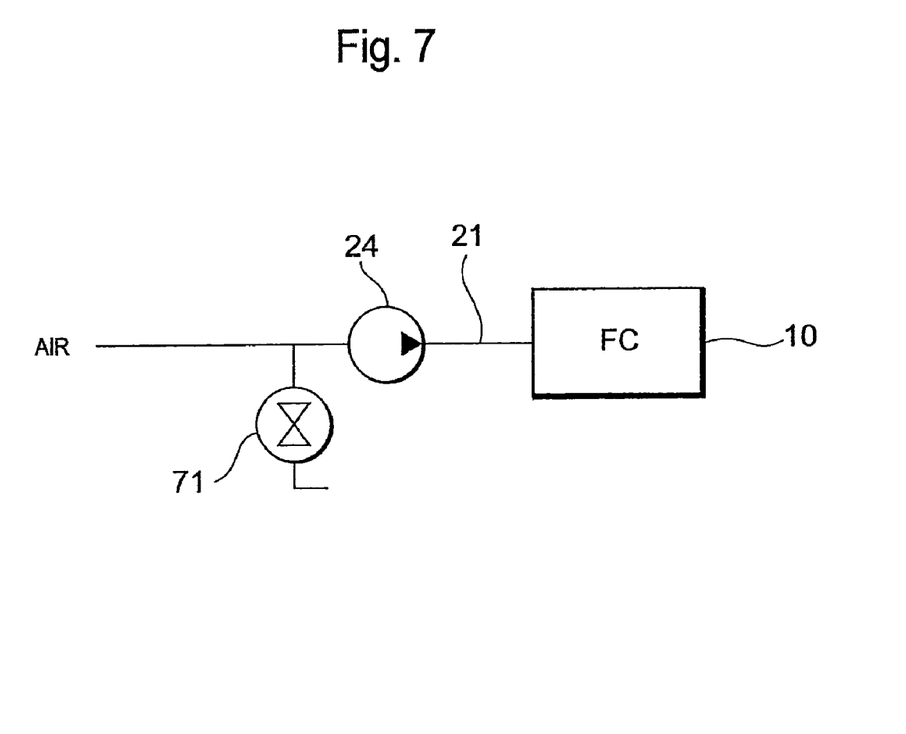
FIG. 7 is a constitution diagram showing a modification of the fuel cell system shown in FIG. 1.
Figure 8:
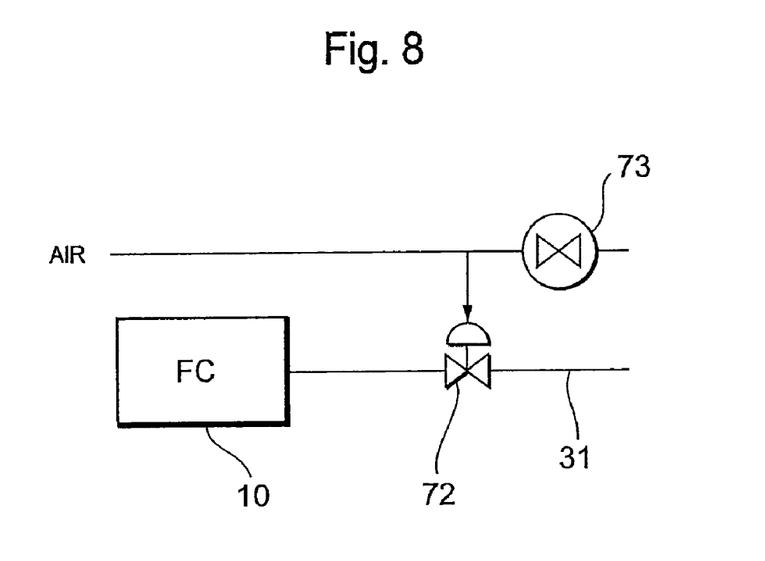
FIG. 8 is a constitution diagram showing a modification of the fuel cell system shown in FIG. 1.

As shown in, for example, FIG. 7, in a case where an air supply channel 21 for supplying an oxidizing gas (air) to a fuel cell 10 is provided with a humidifying water supply injector 71 instead of the humidifier 20, the present invention is applicable to this injector. Alternatively, as shown in FIG. 8, in a case where a hydrogen supply channel 31 for supplying a hydrogen gas to a fuel cell 10 is provided with a pneumatic regulator 72 instead of the injector, the present invention is applicable to a cathode air supply injector 73 for controlling a hydrogen pressure of this pneumatic regulator 72 with an air pressure or the like.

Moreover, in the above embodiment, an example in which the fuel cell system according to the present invention is mounted on the fuel cell vehicle has been described, but the fuel cell system according to the present invention may be mounted on any type of mobile body (a robot, a ship, an airplane or the like) other than the fuel cell vehicle. The fuel cell system according to the present invention may be applied to a stationary power generation system for use as a power generation equipment for construction (housing, building or the like).

INDUSTRIAL APPLICABILITY

The present invention is broadly applicable to a fuel cell system (or a method for operating the system), which is highly responsive and capable of appropriately changing a supply pressure of a fuel gas based on an operation state of a fuel cell, and in which an operator does not easily care about an operation sound of an injector.

What is claimed is:

1. A method for controlling supply of hydrogen gas to a fuel cell comprising:
    providing a hydrogen gas supply channel to supply hydrogen gas from a hydrogen tank to the fuel cell, wherein the hydrogen gas supply channel includes a shut valve which shuts or allows the supply of the hydrogen gas from the hydrogen tank and an injector which adjusts a state of the hydrogen gas on an upstream side of the hydrogen gas supply channel to supply the hydrogen gas to a downstream side; and
    driving and controlling the injector by a control device, wherein the control device allows or prohibits an operation of the injector, or changes a drive cycle of the injector so as to hide or obscure the operation sound of the injector from an operator by a radiant sound of an air compressor located in an oxidizing gas supply channel which feeds an oxidizing gas under pressure to the fuel cell in accordance with driving of the device.

2. The method according to claim 1, wherein the control device controls a drive frequency of the injector based on a frequency of the radiant sound from the air compressor.

3. The method according to claim 1, wherein the fuel gas supply channel further includes a secondary pressure sensor located downstream of the injector for detecting a secondary pressure of the hydrogen gas in the hydrogen gas supply channel, and in a case where the radiant sound from the device which generates the radiant sound is hidden or obscured from the operator, the control device prohibits the operation of the injector until the secondary pressure of the injector lowers to a predetermined lower limit pressure.

4. The method according to claim 3, wherein when the secondary pressure of the injector lowers to the lower limit pressure, the control device allows the operation of the injector to raise the secondary pressure to a predetermined pressure.

5. A method for controlling supply of hydrogen gas to a fuel cell mounted on a mobile body, comprising:
    providing a hydrogen gas supply channel to supply hydrogen gas from a hydrogen tank to the fuel cell, wherein the hydrogen gas supply channel includes a shut valve which shuts or allows the supply of the hydrogen gas from the hydrogen tank and an injector which adjusts a state of the hydrogen gas on an upstream side of the hydrogen gas supply channel to supply the hydrogen gas to a downstream side; and
    driving and controlling the injector by a control device, wherein the control device allows or prohibits an operation of the injector, or changes a drive cycle of the injector based on a movement speed or an accelerated state of the mobile body so as to hide or obscure the operation sound of the injector from an operator.

6. A method for controlling supply of hydrogen gas to a fuel cell comprising:
    providing a hydrogen gas supply channel to supply hydrogen gas from a hydrogen tank to the fuel cell, wherein the hydrogen gas supply channel includes a shut valve which shuts or allows the supply of the hydrogen gas from the hydrogen tank and an injector which adjusts a state of the hydrogen gas on an upstream side of the hydrogen gas supply channel to supply the hydrogen gas to a downstream side, and a secondary pressure sensor located downstream of the injector for detecting a secondary pressure of the hydrogen gas in the hydrogen gas supply channel; and
    driving and controlling the injector by a control device, wherein the control device changes a permissible range of a pressure deviation of the injector based on a radiant sound from a device which generates the radiant sound, and
    the permissible range of a pressure deviation is changed by changing a first control state in which an opening/closing operation of the injector is subjected to feedback control based on a deviation between a detected value of the secondary pressure of the injector and a target control value to a second control state in which execution of the feedback control is prohibited to raise the pressure to a predetermined target pressure at a time when the secondary pressure of the injector lowers to a predetermined lower limit pressure.

7. The method according to claim 6, wherein the fuel cell is mounted on a mobile body,
    wherein the control device changes the permissible range of a pressure deviation of the injector only during an idle operation of the mobile body.

8. A method for controlling supply of hydrogen gas to a fuel cell comprising:
    providing a hydrogen gas supply channel to supply hydrogen gas from a hydrogen tank to the fuel cell, wherein the hydrogen gas supply channel includes a shut valve which shuts or allows the supply of the hydrogen gas from the hydrogen tank and an injector which adjusts a state of the hydrogen gas on an upstream side of the hydrogen gas supply channel to supply the hydrogen gas to a downstream side, and a secondary pressure sensor located downstream of the injector for detecting a secondary pressure of the hydrogen gas in the hydrogen gas supply channel; and
    driving and controlling the injector by a control device, wherein the control device changes a permissible range of a pressure deviation of the injector based on a radiant sound from a device which generates the radiant sound, and
    the permissible range of a pressure deviation is changed by changing a first control state in which when a deviation between a detected value of the secondary pressure of the injector and a target control value is less than a predetermined value, the deviation is regarded as "0", whereas when the deviation has the predetermined value or more, an opening/closing operation of the injector is subjected to feedback control based on the deviation to a second state in which the predetermined value is increased as compared with the first control state.

9. The method according to claim 8, wherein the fuel cell is mounted on a mobile body, wherein the control device changes the permissible range of a pressure deviation of the injector only during an idle operation of the mobile body.

10. A method for controlling supply of hydrogen gas to a fuel cell mounted on a mobile body, comprising:

providing a hydrogen gas supply channel to supply hydrogen gas from a hydrogen tank to the fuel cell, wherein the hydrogen gas supply channel includes a shut valve which shuts or allows the supply of the hydrogen gas from the hydrogen tank and an injector which adjusts a state of the hydrogen gas on an upstream side of the hydrogen gas supply channel to supply the hydrogen gas to a downstream side; and driving and controlling the injector by a control device, wherein the control device allows or prohibits an operation of the injector or changing a drive cycle of the injector based on a movement state of the mobile body so as to hide or obscure the operation sound of the injector from an operator.

* * * * *